US012378806B2

(12) United States Patent
Duer

(10) Patent No.: US 12,378,806 B2
(45) Date of Patent: Aug. 5, 2025

(54) ASSEMBLY FOR GUIDING AT LEAST ONE MOVABLE FURNITURE PART RELATIVE TO A FURNITURE BODY

(71) Applicant: Julius Blum GmbH, Hoechst (AT)

(72) Inventor: Stefan Duer, Schwarzach (AT)

(73) Assignee: Julius Blum GmbH, Hoechst (AT)

( * ) Notice: Subject to any disclaimer, the term of this patent is extended or adjusted under 35 U.S.C. 154(b) by 230 days.

(21) Appl. No.: 18/210,233

(22) Filed: Jun. 15, 2023

(65) Prior Publication Data

US 2023/0323719 A1 Oct. 12, 2023

Related U.S. Application Data

(63) Continuation of application No. PCT/AT2021/060471, filed on Dec. 14, 2021.

(30) Foreign Application Priority Data

Dec. 17, 2020 (AT) .............................. A 51106/2020

(51) Int. Cl.
*E05D 15/58* (2006.01)
*E05D 15/06* (2006.01)
(Continued)

(52) U.S. Cl.
CPC ......... *E05D 15/58* (2013.01); *E05D 15/0604* (2013.01); *E05D 15/264* (2013.01);
(Continued)

(58) Field of Classification Search
CPC ... E05D 15/0604; E05D 15/264; E05D 15/58; E05F 1/16; E05Y 2900/212; E05Y 2201/654
See application file for complete search history.

(56) References Cited

U.S. PATENT DOCUMENTS 8,344,670 B2 1/2013 Gassner
10,619,407 B2 4/2020 Kawabe et al.
(Continued)

FOREIGN PATENT DOCUMENTS

AT 503 881 1/2008
AT 505 207 11/2008
(Continued)

OTHER PUBLICATIONS

Translation DE202020107104U1 (Year: 2021).*
International Search Report issued Mar. 15, 2022 in International (PCT) Application No. PCT/AT2021/060471.

*Primary Examiner* — Andrew Roersma
(74) *Attorney, Agent, or Firm* — Wenderoth, Lind & Ponack, L.L.P.

(57) ABSTRACT

An assembly for guiding a movable furniture part relative to a furniture carcass includes a guide system which is to be fastened to the furniture carcass; a support on which the movable furniture part is or can be mounted, in particular in a pivotable and/or articulated manner, and by which the movable furniture part can be moved relative to the guide system; and a drive device by which the support can be moved relative to the guide system and which has a cable, with a coupling device being positioned on the movable furniture part and/or the support. The coupling device can be automatically coupled to the cable of the drive device during a movement of the support relative to the guide system.

26 Claims, 10 Drawing Sheets

(51) Int. Cl.
*E05D 15/26* (2006.01)
*E05F 1/16* (2006.01)

(52) U.S. Cl.
CPC .......... *E05F 1/16* (2013.01); *E05Y 2201/654* (2013.01); *E05Y 2900/212* (2013.01)

(56) References Cited

U.S. PATENT DOCUMENTS

| | | | | |
|---|---|---|---|---|
| 11,008,791 | B2 | 5/2021 | Rupp et al. | |
| 11,428,034 | B2 | 8/2022 | Rupp et al. | |
| 11,492,833 | B2 | 11/2022 | Sperger et al. | |
| 2010/0038467 | A1 | 2/2010 | Gassner | |
| 2018/0128032 | A1* | 5/2018 | Karle | E05F 15/635 |
| 2018/0347263 | A1 | 12/2018 | Kawabe et al. | |
| 2019/0301218 | A1 | 10/2019 | Rupp et al. | |
| 2019/0330898 | A1 | 10/2019 | Rupp et al. | |
| 2020/0018108 | A1 | 1/2020 | Sperger et al. | |
| 2023/0332449 | A1* | 10/2023 | Duer | E05D 15/0621 |

FOREIGN PATENT DOCUMENTS

| | | | | |
|---|---|---|---|---|
| AT | 519902 | | 11/2018 | |
| AT | 521149 | B1 * | 11/2019 | E05D 15/264 |
| DE | 20 2007 008 561 | | 9/2007 | |
| DE | 102017116061 | A1 * | 1/2019 | A47B 88/453 |
| DE | 20 2020 107 104 | | 2/2021 | |
| EP | 1394349 | A1 * | 3/2004 | E05D 15/58 |
| EP | 2 194 219 | | 6/2010 | |
| EP | 3272982 | A1 * | 1/2018 | E05D 13/10 |
| JP | 2008-57258 | | 3/2008 | |
| JP | 2010-525840 | | 7/2010 | |
| JP | 2010-284378 | | 12/2010 | |
| JP | 2020-518741 | | 6/2020 | |
| JP | 2020-191789 | | 12/2020 | |
| KR | 10-2018-0106308 | | 10/2018 | |
| TW | 201900072 | | 1/2019 | |
| TW | 201903273 | | 1/2019 | |
| WO | 2008/128257 | | 10/2008 | |
| WO | 2018/129568 | | 7/2018 | |
| WO | 2018/129573 | | 7/2018 | |
| WO | WO-2019014693 | A1 * | 1/2019 | A47B 88/40 |
| WO | WO-2021003507 | A1 * | 1/2021 | E05D 15/06 |
| WO | WO-2021119692 | A1 * | 6/2021 | E05D 13/04 |

* cited by examiner

ASSEMBLY FOR GUIDING AT LEAST ONE MOVABLE FURNITURE PART RELATIVE TO A FURNITURE BODY

BACKGROUND OF THE INVENTION

The invention relates to an assembly for guiding at least one movable furniture part, in particular a sliding door or folding sliding door, relative to a furniture carcass, comprising at least one guide system that is fastened or fastenable to the furniture carcass, at least one carrier on which the at least one movable furniture part is mounted or mountable in particular in a pivotable and/or articulated manner and by means of which the at least one movable furniture part is movable relative to the at least one guide system, and at least one drive device, by means of which the at least one carrier is movable relative to the at least one guide system, with at least one cable. The invention furthermore relates to a piece of furniture with at least one such assembly, and to a method for installing and coupling such an assembly.

Such an assembly is already known from the Austrian patent application with the file reference A 51123/2019, in which a cable of a drive device is, in the delivery condition of the drive device, arranged on the drive device by means of balls, such that a fitter must manually remove the balls from the drive device in order to then—likewise manually—arrange it on a carrier such that the drive device can support an extension of the carrier out of a receiving slot.

A disadvantage of the prior art is that manually attaching the cable of the drive device to the carrier is cumbersome and requires additional time during the installation of the assembly. In particular in the case of a receiving slot that has already been assembled, the attachment process is inconvenient owing to the drive device being located at a concealed position in the receiving slot and necessitates that the receiving slot be disassembled. If, for example, the cable undesirably detaches from the arrangement on the carrier during an operation (for example as a result of vibrations and/or incorrect attachment), there is no user-friendly means of being able to guarantee proper functionality of the assembly. In practice, the coupling of the drive device to the carrier is often overlooked or not properly corrected, as a result of which an increased expenditure of force is required to move the movable furniture part, and it is furthermore difficult, during an operation, to identify the cause of the increased expenditure of force.

SUMMARY OF THE INVENTION

It is therefore the objective of the present invention to specify an assembly which is improved in relation to the prior art, a piece of furniture, and a method, with which the disadvantages of the prior art are at least partially eliminated and which are distinguished in particular by particularly convenient coupling of the cable of the drive device to a carrier or to a movable furniture part, wherein the risk of a missing attachment of drive device and carrier/movable furniture part is reduced.

According to the invention, at least one coupling device is arranged on the at least one movable furniture part and/or on the at least one carrier, wherein the at least one coupling device is automatically couplable to the at least one cable of the at least one drive device during a relative movement of the at least one carrier with respect to the at least one guide system, whereby the at least one drive device has at least one exit opening through which the at least one cable of the drive device, in a state of use, projects substantially vertically downward under the force of gravity for the purpose of coupling to the at least one coupling device.

It is thus made possible for the first time that, after the at least one carrier has been installed on the at least one guide system, no additional manual coupling steps need to be performed by the fitter, because the attachment of drive unit and carrier can be generated as a result of the relative movement itself.

There is the further positive aspect that, in the event of any detachment of the coupling, the coupling is automatically effected anew after another movement from an extended position (for example an active position for subsequently covering fitments) in the direction of a retracted position (for example a recessed position in a receiving slot) of the at least one carrier or of the at least one movable furniture part.

Accordingly, the fitter need only arrange the at least one carrier on the at least one guide system, wherein, when the at least one movable furniture part is pushed into a furniture slot, the at least one coupling device carries along the at least one cable during a relative movement of the at least one carrier, and the at least one drive device absorbs energy that supports and/or causes a movement of the at least one movable furniture part in the direction of the extended position.

In general, the coupling can be maintained between a time of the initial coupling and a process of uninstalling the assembly, for example by virtue of the at least one cable being clamped in the at least one coupling device by means of a coupling element of the at least one cable, for example, or be effected anew during a movement of the at least one carrier from the extended position into the retracted position.

The at least one coupling device can for example be formed forked and/or comprise a forked region for receiving the at least one cable and/or at least one coupling element of the at least one cable, wherein the at least one cable and/or the at least one coupling element of the at least one cable can be brought into abutment, at least in regions, within the forked coupling device, can preferably be clamped in the forked coupling device and/or brought into friction locking with the forked coupling device and/or brought into positive locking with the forked coupling device in a direction along the at least one cable and/or the at least one coupling element.

The term “cable” is to be interpreted broadly as analogously also encompassing, for example, a chain or other flexible components that can be placed under tensile load, such as cords, threads or wires.

As stated at the beginning, protection is also sought for a piece of furniture with at least one such assembly.

The automatic coupling increases functional reliability of the assembly, wherein, as a result of a stress being imparted during a process of pushing the at least one carrier in, a process of pushing the at least one movable furniture part out is made more convenient.

Furthermore, as a result of the attachment of the at least one movable furniture part, a movement out of the furniture slot in a direction transverse with respect to the furniture slot can be effected in a particularly expedient manner, because the at least one movable furniture part is forced in the direction of the extended position, and a guided movement for covering fitments is thereby made easier.

As stated at the beginning, protection is also sought for a method for installing and coupling such an assembly, with the following method steps:

- the at least one carrier is arranged on the at least one guide system in a preparatory step, the at least one carrier is moved relative to the at least one guide system in a first step, as a result of which the at least one cable of the at least one drive device is automatically coupled to the coupling device in a second step.

According to an advantageous design of the invention, the at least one guide system comprises at least one first guide rail, with a longitudinal direction, for guiding the at least one movable furniture part along the first guide rail, and/or comprises at least one second guide rail for guiding the at least one movable furniture part, wherein the at least one second guide rail, in a state of use, runs transversely relative to the longitudinal direction of the first guide rail, and/or the at least one movable furniture part is movable by means of the at least one carrier along the at least one first guide rail between an extended position and a retracted position.

By means of at least one first rail and at least one second rail, it is made possible for the at least one movable furniture part to be arranged in specific positions on the at least one guide system, which can for example include a parked position or a covering position, wherein secure guidance between the individual positions can be guaranteed.

The extended position and the retracted position are applicable in relation to all component parts of the assembly, wherein two different relative positions of the at least one carrier with respect to the at least one guide system are expressed.

It is advantageously provided that, during an initial relative movement of the at least one carrier with respect to the at least one guide system, the at least one coupling device is automatically couplable to the at least one cable, and/or the at least one cable is connected to the at least one coupling device in the extended position, in the retracted position and/or between the extended position and the retracted position.

If, after an initial relative movement, the coupling is maintained during an operation of the assembly, the possibility of a secure coupling not occurring, possibly owing to an incorrect orientation of the at least one cable, can be prevented. This situation can be remedied for example by virtue of the cable being clamped by means of a clamping mechanism, wherein the at least one cable remains securely connected to the at least one coupling device during a movement of the at least one movable furniture part.

It has proven to be expedient that the at least one drive device comprises at least one cable drum for winding up and unwinding the at least one cable and at least one energy storage device for prestressing the at least one cable drum, wherein it is preferably provided that the at least one cable drum and/or the at least one energy storage device is arranged, particularly preferably entirely, within a housing of the at least one drive device.

In general, in the extended position, the at least one cable is wound up on the at least one cable drum for compact storage, wherein a free end projects out of the at least one drive device. When the at least one cable is pulled out of the at least one drive device as a result of a relative movement of the at least one carrier in the direction of the retracted position, the at least one energy storage device is prestressed, wherein the stored energy is released to the at least one movable furniture part during a movement of the at least one movable furniture part in the direction of the extended position.

According to an advantageous embodiment of the invention, the at least one energy storage device can be placed under stress during a movement of the at least one carrier in the direction of a retracted position, and/or is prestressed or unstressed in an extended position.

It has proven to be advantageous that the at least one cable of the at least one drive device comprises at least one coupling element, preferably in the form of a ball, for connecting the at least one cable to the at least one coupling device, and/or comprises a spacer element, preferably a frustum, which is spaced apart from the at least one coupling element, for spacing the at least one coupling element preferably from an optionally provided housing of the at least one drive device.

The at least one spacer element firstly provides a means of adjustment, giving increased flexibility in the coupling, in particular in the case of varying structural sizes of component parts of the assembly. Secondly, the at least one coupling element is distanced from the housing or other component parts, such as a guide rail, in order to be able to generate the coupling in a particularly expedient manner.

The at least one coupling element inhibits an undesired detachment of the at least one cable from the at least one coupling device, resulting in a secure assembly for moving the movable furniture part. Undesired slipping of the cable relative to the at least one coupling device can be prevented.

According to the present invention, the at least one drive device has at least one exit opening through which the at least one cable of the drive device, in a state of use, projects substantially vertically downward under the force of gravity for the purpose of coupling to the at least one coupling device.

If the at least one exit opening is located at the bottom when the assembly is in the state of use, the cable can assume a defined position, wherein the at least one drive device can be particularly easily attached to the at least one movable furniture part. The at least one exit opening is particularly preferably arranged on a side of a housing of the at least one drive device, which side is oriented parallel to the at least one first guide rail.

Preferably, the at least one coupling device comprises at least one receiving device which preferably comprises a tapering depression and/or a holding region.

The at least one receiving device can, for example, be formed as a wedge-shaped receptacle with two side surfaces which taper toward one another. In general, a convexly or concavely curved receiving device, or a receiving device configured as a flap mechanism, is for example also possible.

The holding region is particularly preferably arranged adjacent to, and materially bonded to, the at least one receiving device. The holding region ensures a positionally secure coupling of the at least one cable to the at least one coupling device and can be formed for example in the form of a clamping device. Attachment by hook-and-loop and/or adhesive means is also conceivable.

In the prior art, the cable must be manually maneuvered into a receiving device. The solution with the at least one receiving device that is automatically couplable to the cable offers greater convenience here.

According to a preferred embodiment of the invention, the at least one coupling device comprises a base, preferably with at least one opening for fastening means, for connecting to the at least one movable furniture part and/or to the at least one carrier, wherein preferably, transversely with respect to the base, at least one bar which has the at least one receiving device, and/or a further bar for stiffening purposes, is arranged on the base.

The coupling device is particularly preferably formed metallic. The coupling device can, however, generally also be manufactured from plastic, for example.

It has proven to be expedient for the at least one carrier to be movable, preferably automatically, starting from a retracted position, into an extended position by means of the at least one drive device.

The at least one drive device can support no manual movement of the at least one movable furniture part or replace a manual actuation by virtue of the movement being performed automatically.

In an embodiment of the invention, at least one ejection mechanism is provided, with which the at least one carrier can be at least partially ejected, starting from a retracted position, in the direction of an extended position by the at least one ejection mechanism. Preferably, the at least one carrier, in the retracted position, is movable by exertion of pressure on the at least one carrier into an overpressed position situated behind the retracted position, whereby the ejection mechanism can be triggered.

The at least one ejection mechanism can initiate the movement of the at least one movable furniture part along the at least one guide system, wherein a transition from a parked position into a relative movement in the direction of the extended position can be effected.

In a further design of the invention, the assembly comprises at least one receiving slot in which the at least one movable furniture part is arrangeable, preferably in its entirety, in a retracted position, wherein it is preferably provided that the at least one movable furniture part, in an extended position, is movable transversely with respect to a longitudinal extent of the at least one receiving slot, particularly preferably by means of at least one optionally provided second guide rail, in order to conceal a fitment.

Owing to the at least one receiving slot, an esthetically appealing piece of furniture is obtained, wherein the assembly can be hidden within the at least one receiving slot and, when required, the at least one movable furniture part can be pulled out and moved in the direction transverse with respect to the longitudinal extent, in order to conceal fitments.

It is particularly preferable that the piece of furniture has a furniture carcass and at least two furniture parts that are mounted so as to be movable relative to the furniture carcass, wherein the furniture parts, in a state of use, are connected to one another in an articulated manner by means of a vertically running axle, wherein the at least two furniture parts are movable by means of the assembly between a first position, in which the furniture parts are oriented substantially parallel to one another, and a second position, in which the furniture parts are oriented so as to be substantially coplanar with respect to one another, wherein it is preferably provided that the furniture carcass has at least one receiving slot for receiving the furniture parts in the first position, and/or the furniture parts are movable by means of at least one drive device from a retracted position in the direction of an extended position.

The assembly is particularly suitable for use with a multi-part folding sliding door. Movable furniture parts are however also provided in the form of single-piece panels.

According to an advantageous embodiment of the invention, at least one energy storage device of the at least one drive device is placed under stress during a movement of the carrier from an extended position in the direction of a retracted position, and/or a movement of the carrier from a retracted position in the direction of an extended position is supported, preferably with the aid of at least one ejection mechanism.

The at least one drive device is particularly preferably arranged on a furniture panel and/or on the at least one guide system of the assembly, wherein it is preferably provided that the at least one drive device is arranged between two furniture panels of a receiving slot.

BRIEF DESCRIPTION OF THE DRAWINGS

Further details and advantages of the present invention will be discussed in more detail below on the basis of the description of the invention with reference to the embodiments illustrated in the drawings, in which.

DETAILED DESCRIPTION OF THE INVENTION

Figure 1A:
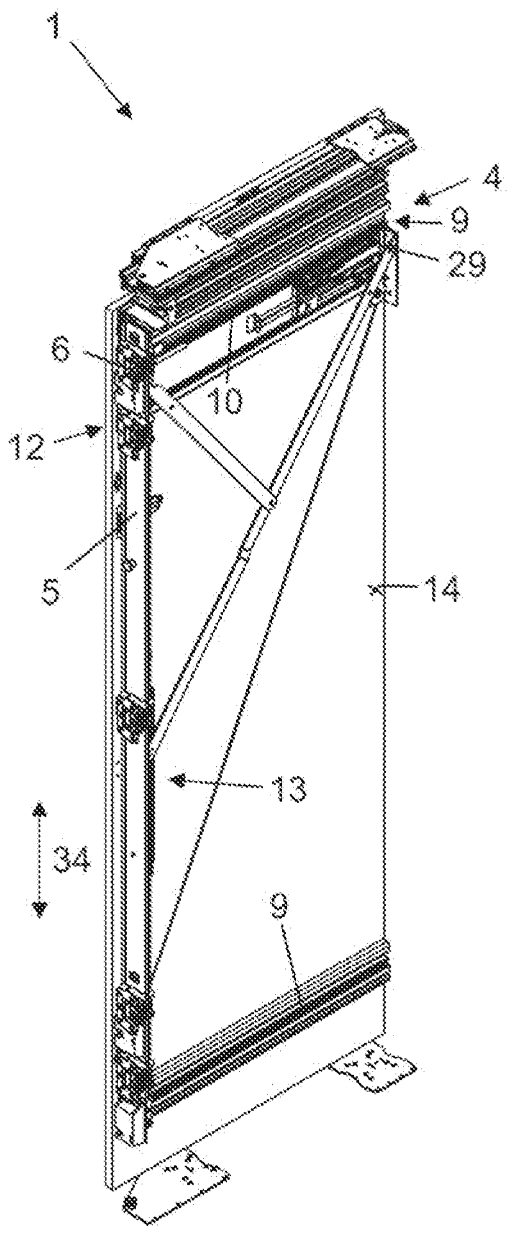
FIGS. 1*a*, lb show an assembly according to a particularly preferred embodiment, in a perspective view.
Figure 1B:
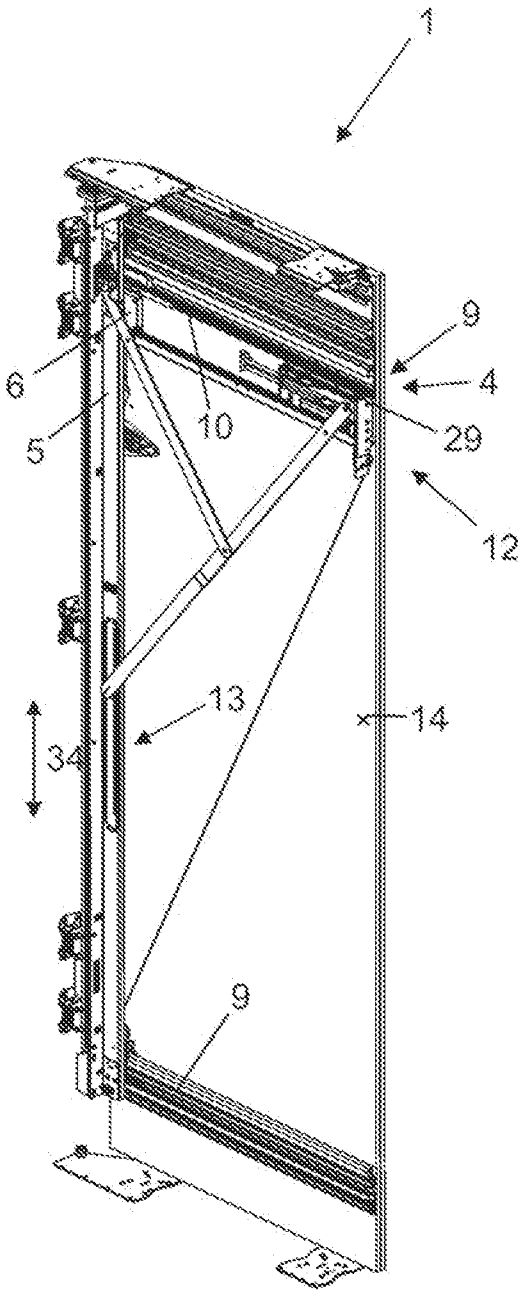

FIGS. 1*a* and 1*b* show an assembly 1 for guiding a movable furniture part 2 (not illustrated for the sake of clarity, see FIG. 10) relative to a furniture carcass 3, comprising a guide system 4, which is fastenable to the furniture carcass 3, and a carrier 5, on which the movable furniture part 2 is mountable in a pivotable and articulated manner. The explicit design of the carrier 5 is generally as desired; for example, the carrier 5 can be a bar, beam, girder, plate, rail or the like, wherein the carrier 5 can also be of multi-part form. The movable furniture part 2 is movable relative to the guide system 4 by means of the carrier 5.

The guide system 4 comprises two first guide rails 9, with a longitudinal direction 10, for guiding the movable furniture part 2 along the first guide rails 9, wherein the number of guide rails 9 is generally as desired. The movable furniture part 2 is movable by means of the carrier 5 along the first guide rails 9 between an extended position 13 and a retracted position 14. The retracted position 14 is indicated by a cross (X), at the position of which, if two furniture panels are arranged on the guide system 4, the movable furniture part 2 has been fully pushed into a receiving slot 30 formed thereby (see FIG. 10), wherein in general a situation in which the movable furniture part 2 has been partially pushed in along the first guide rails 9 can also be utilized as a retracted position 14.

For stable guidance of the movable furniture part 2, a Y-shaped reinforcement structure, in the form of struts connected in an articulated manner, and a diagonally extending guide cable are provided, wherein it is also possible for only the Y-shaped reinforcement structure or the guide cable to be used, or for these to be omitted entirely.

Figure 2:
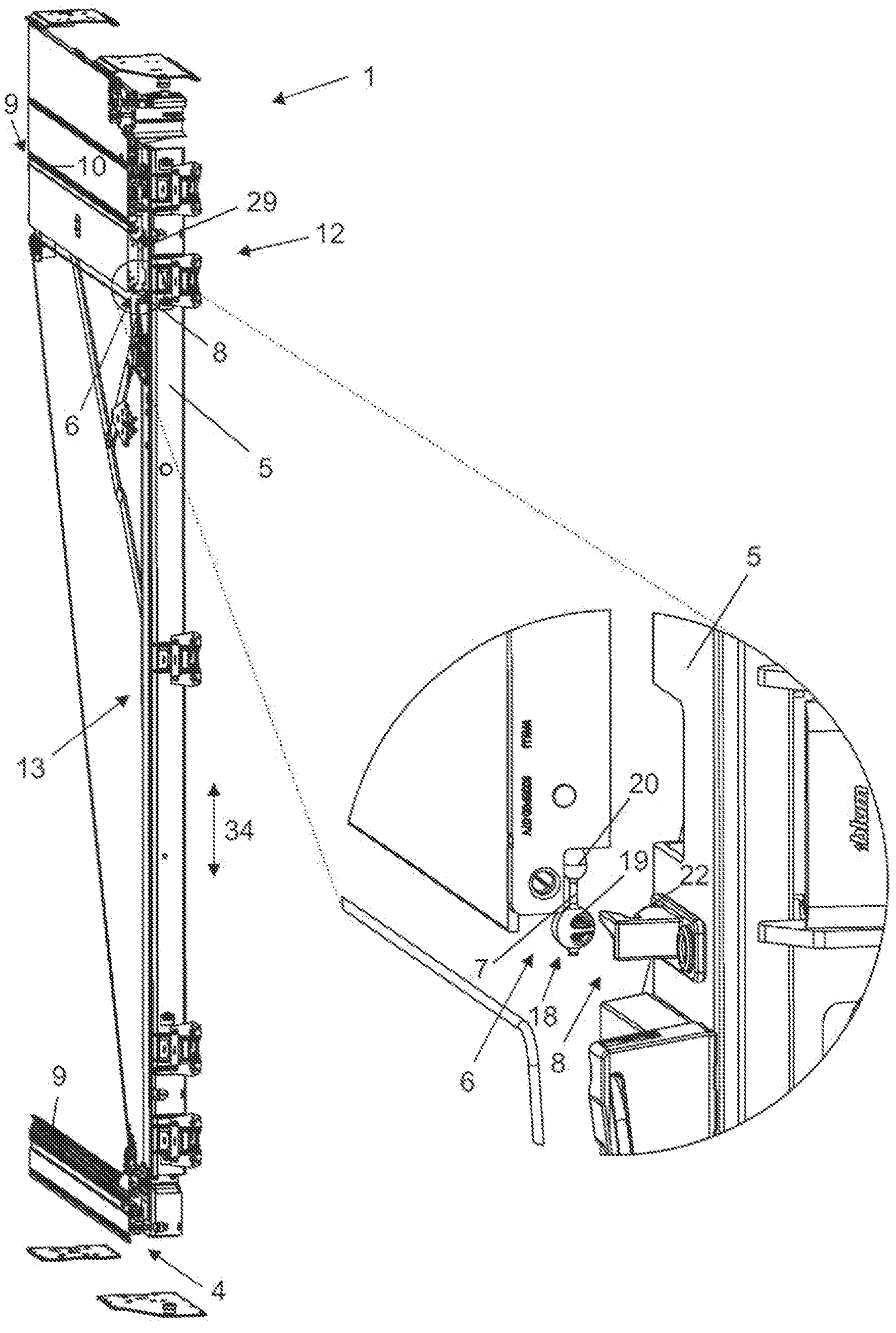
FIG. 2 shows the assembly according to the embodiment according to FIG. 1*a*-without a furniture wall—with a detailed view of a coupling device and a drive device before a coupling operation, in a perspective illustration.

FIG. 2 shows the assembly 1, wherein, for illustrative purposes, the two furniture panels that form the receiving slot 30 are not illustrated.

The assembly 1 comprises a drive device 6 which is arranged concealed behind a covering panel. The drive device 6 comprises a cable 7 which—as can be seen in the detailed view—projects below the covering panel. A coupling device 8 is arranged on the carrier 5, wherein the coupling device 8 is automatically coupled to the cable 7 of the drive device 6 during a relative movement of the carrier 5 with respect to the guide system 4 in the direction of the retracted position 14.

In general, the coupling device 8 can be arranged on the movable furniture part 2. In conjunction with the drive device 6, the carrier 5 is movable relative to the guide system 4 by means of the drive device 6.

The carrier 5 is movable automatically, starting from the retracted position 14, into the extended position 13 by means of the drive device 6, wherein support of a manual movement is also possible, depending on a force setting of the drive device 6.

Figure 3:
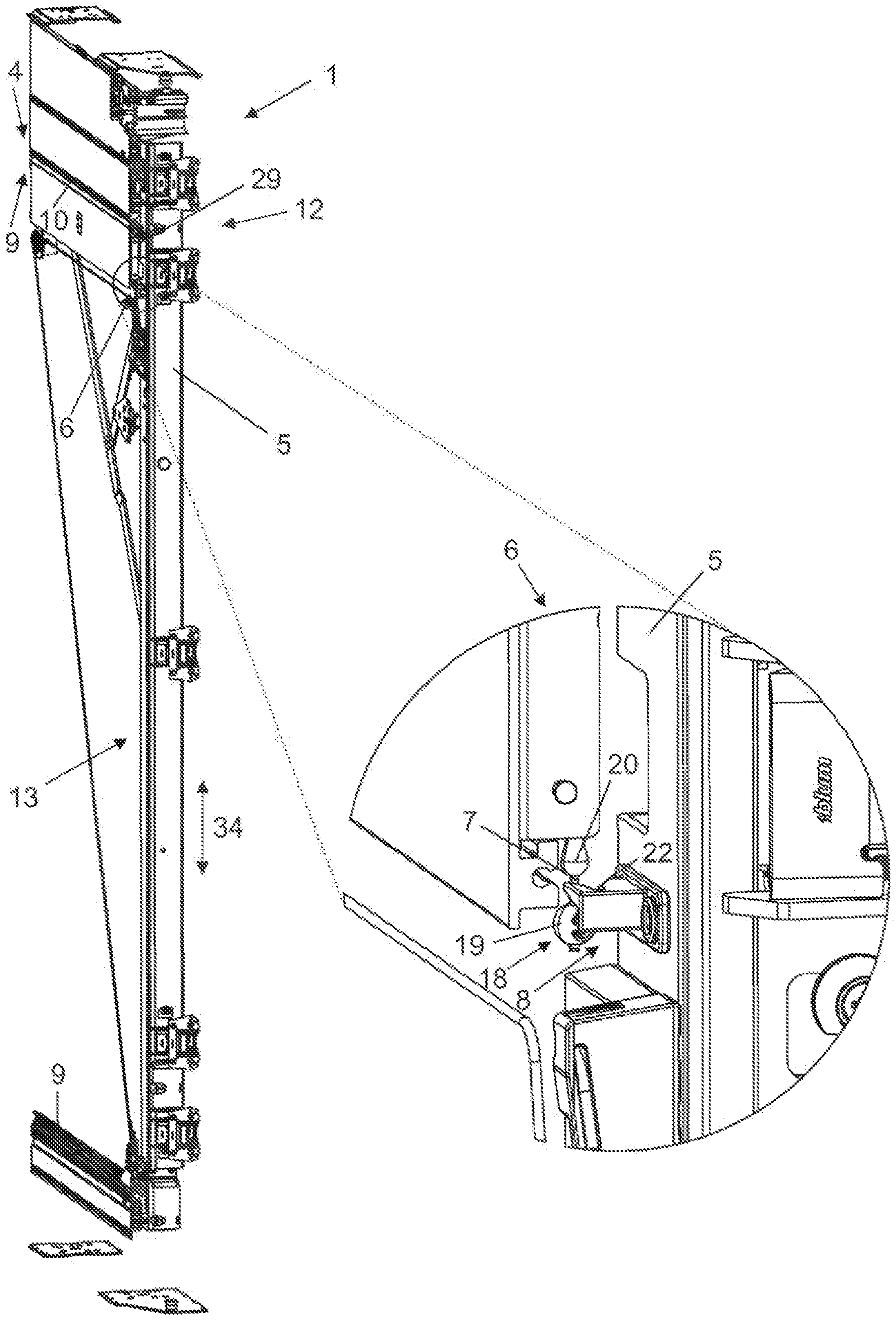
FIG. 3 shows the assembly according to the embodiment according to FIG. 1*a*-without a furniture wall and without a covering panel—with a detailed view of the coupling device and the drive device shortly before contact is established between the coupling device and a cable of the drive device.

FIG. 3 shows the assembly 1, with a covering panel, not illustrated, during an initial relative movement of the carrier 5 along the first guide rails 9 in the direction of the retracted position 14 for the purpose of establishing contact, and subsequently coupling, between the drive device 6 and the carrier 5.

The coupling can be generated as follows:

- the carrier 5 is arranged on the guide system 4 in a preparatory step (this has already taken place in the illustration),
- the carrier 5 is moved relative to the guide system 4 in a first step (visible in the illustration), as a result of which
- the cable 7 of the drive device 6 is automatically coupled to the coupling device 8 (as a result of contact subsequently being established) in a second step.

The coupling can be performed once and maintained or carried out anew after the carrier 5 has been positioned in the extended position 13.

An ejection mechanism 29 is provided, with which the carrier 5 can be partially ejected, starting from the retracted position 14, in the direction of the extended position 13 by the ejection mechanism 29. The carrier 5, in the retracted position 14, is movable by exertion of pressure on the carrier 5 into an overpressed position situated behind the retracted position 14, whereby the ejection mechanism 29 can be triggered and ejects the carrier 5 in the direction of the extended position 13, wherein a movement into the extended position 13 is performed by means of the drive device 6.

Figure 4A:
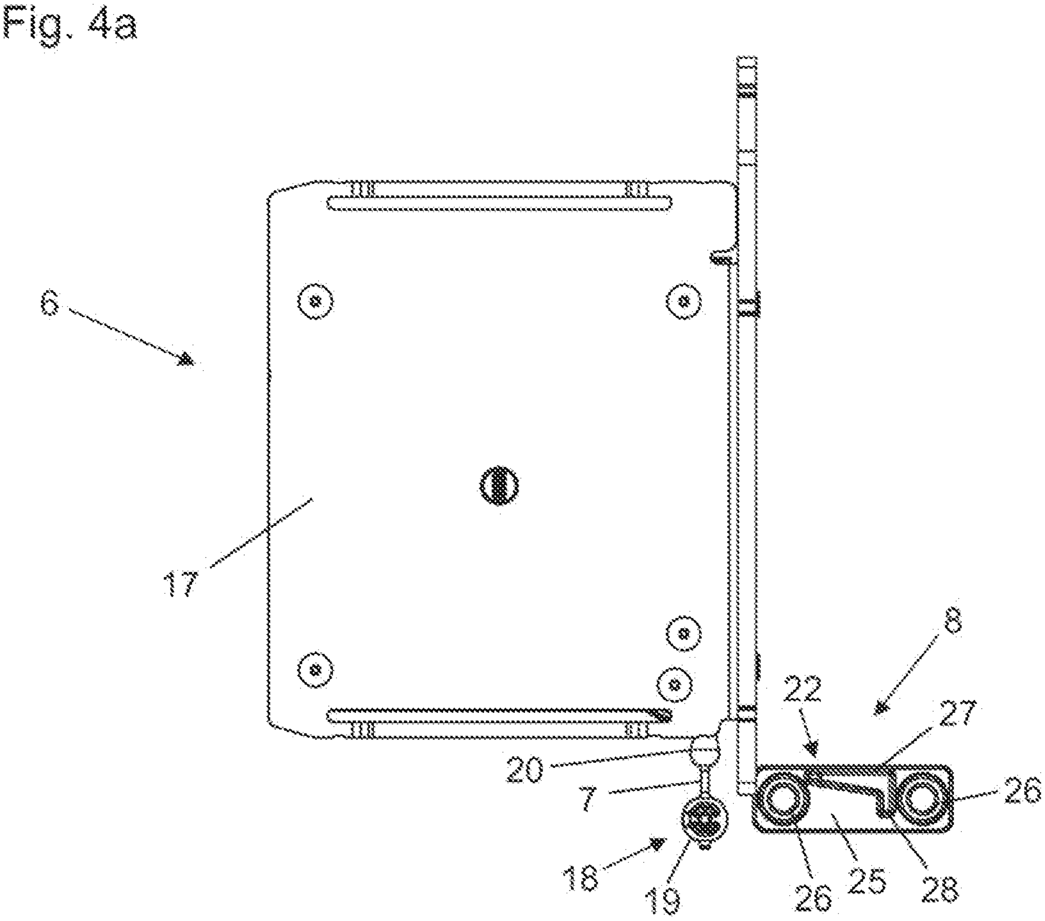
FIGS. 4*a*, 4*b* show a drive device and a coupling device according to a preferred embodiment before a coupling operation, in a view from the side and in a perspective view from below.

FIG. 4*a* shows the drive device 6 and the coupling device 8 before a coupling operation is carried out. A covering flap is fastenable to the drive device 6 by fastening means.

The cable 7 projects out of a housing 17 of the drive device 6, wherein the cable 7 has a coupling element 18 in the form of a ball 19 for the purpose of connecting the cable 7 to the coupling device 8. When the cable 7 is arranged in the coupling device 8, the coupling element 18 becomes caught and prevents an undesired detachment of the cable 7 from the coupling device 8. The coupling can be provided in a positive-locking and/or friction-locking manner.

The cable 7 comprises a spacer element 20 in the form of a frustum, which is spaced apart from the coupling element 18, for spacing the coupling element 18 from the housing 17. Cylindrical, spherical or other spacer elements 20 are generally also possible for spacing the coupling element 18 from the drive device such that a secure automatic coupling to the coupling device 8 can be performed. It is also conceivable that, when the cable 7 is in an unstressed state, the coupling element 18 projects out of the housing 17 of its own accord under the force of gravity by an in particular defined length of cable, whereby the spacer element 20 can be omitted.

Figure 4B:
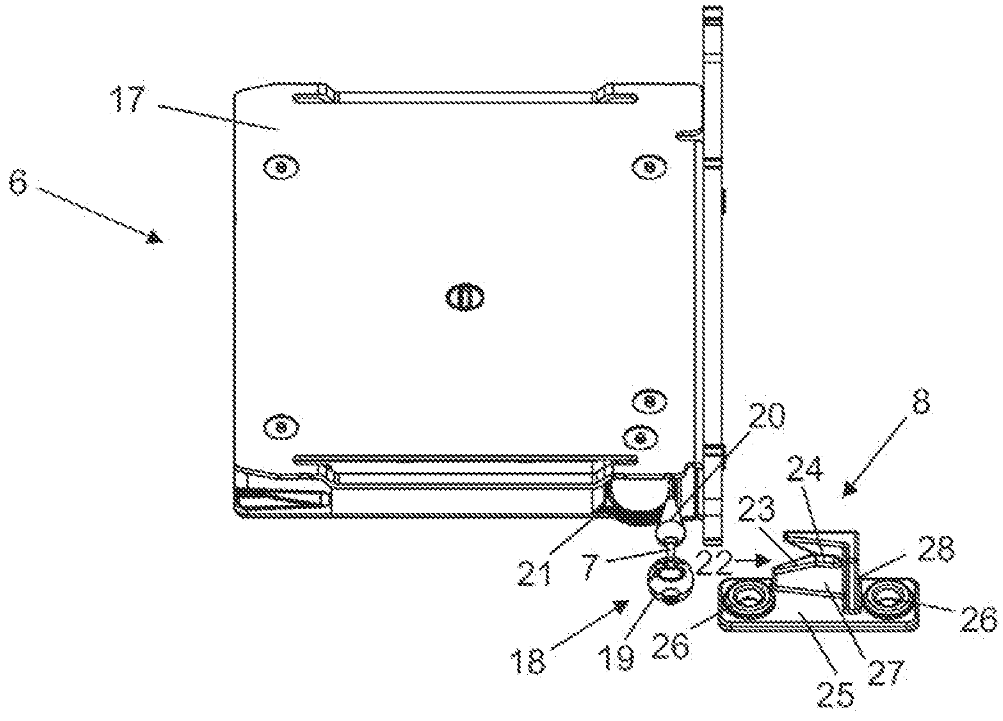

FIG. 4*b* shows the geometric design of the drive device 6 and of the coupling device 8 from a viewing direction that is inclined in relation to FIG. 4*a*.

The coupling device 8 comprises a receiving device 22 which comprises a tapering depression 23 and a holding region 24. The receiving device 22 is designed to receive a cable portion that adjoins the coupling element 18, wherein the holding region 24 is formed correspondingly to the cable in order to be able to accomplish a secure connection of the coupling device 8 to the cable 7.

The coupling device 8 has a receiving device 22 which comprises two oblique surfaces that enclose an acute angle with one another. The oblique surfaces can generally also enclose a right angle or an obtuse angle with one another.

Figure 5A:
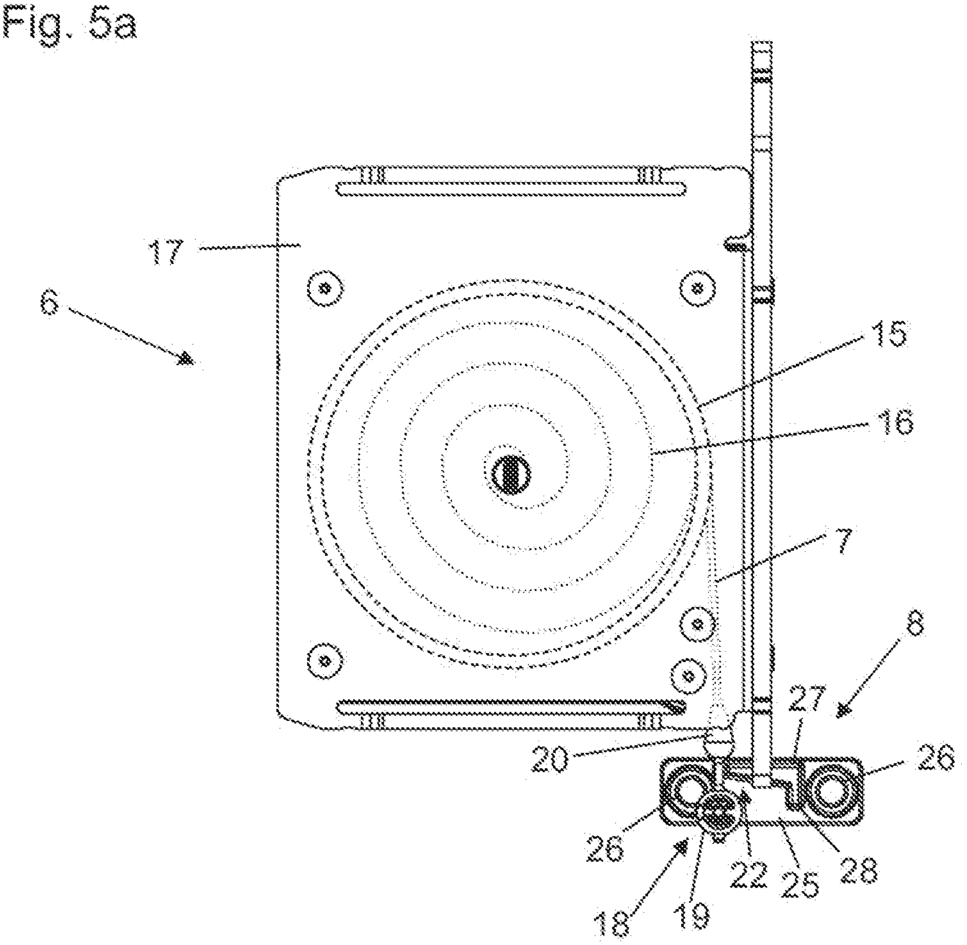
FIGS. 5*a*, 5*b* show the drive device and coupling device according to FIG. 4*a*, wherein the coupling device has been moved in the direction of the cable, in a view from the side and in a perspective view from below.
Figure 5B:
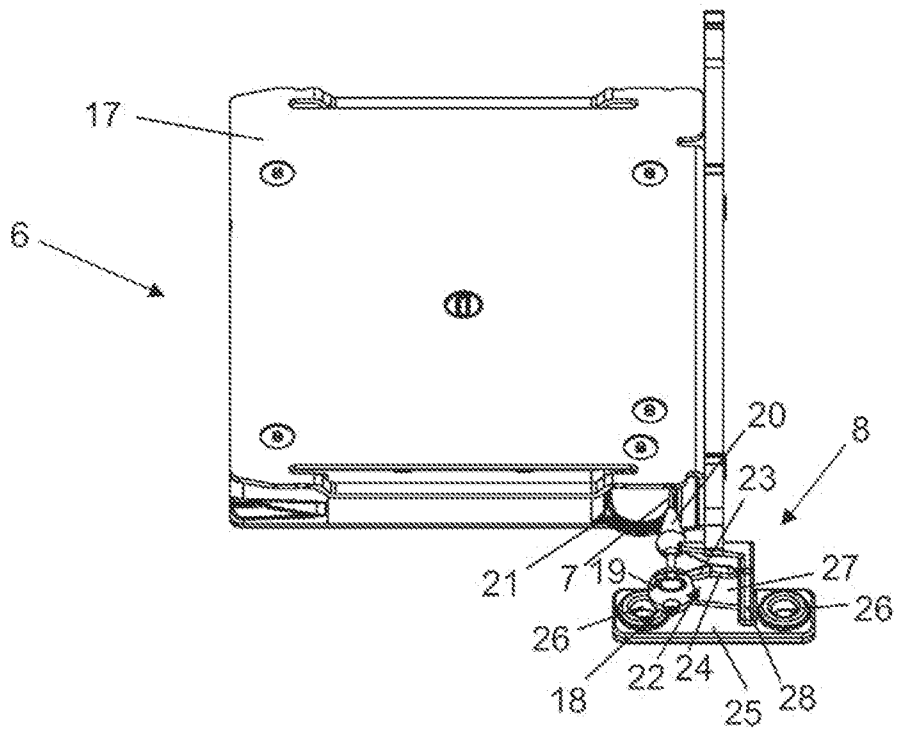

FIG. 5*a* and FIG. 5*b* differ from FIG. 4*a* and FIG. 4*b* merely by the fact that the coupling device 8 has been moved in the direction of the cable 7, and the assembly 1 is thus in a situation shortly before the coupling operation.

In FIG. 5*a*, an energy storage device 16 of the drive device 6 has been illustrated, using a dotted line, in the form of a spiral spring that is concealed by the housing 17. In general, the energy storage device 16 can also comprise other energy stores such as fluid energy stores, leaf springs, tension springs or compression springs. The energy storage device 16 is placed under stress during a movement of the carrier 5 from the extended position 13 in the direction of the retracted position 14.

A movement of the carrier 5 from the retracted position 14 in the direction of the extended position 13 is supported by the energy storage device 16, wherein an ejection mechanism 29 (not visible in the illustration) can be used in a first portion of the movement.

The energy storage device 16 can be placed under stress during a movement of the carrier 5 in the direction of the retracted position 14 and can be prestressed or unstressed in the extended position 13 depending on the demands placed on the assembly 1. The energy storage device 16 can generally also comprise an adjustment device for adjusting the energy store.

The drive device 6 comprises a cable drum 15 (illustrated by dashed lines) for winding up and unwinding the cable 7, wherein the energy storage device 16 is provided for prestressing the cable drum 15. The cable drum 15 and the energy storage device 16 are arranged entirely within the housing 17 of the drive device 6. It is generally also possible for a partial arrangement in the housing 17 to be provided, or for the housing 17 to be designed as an enclosure.

Figure 6A:
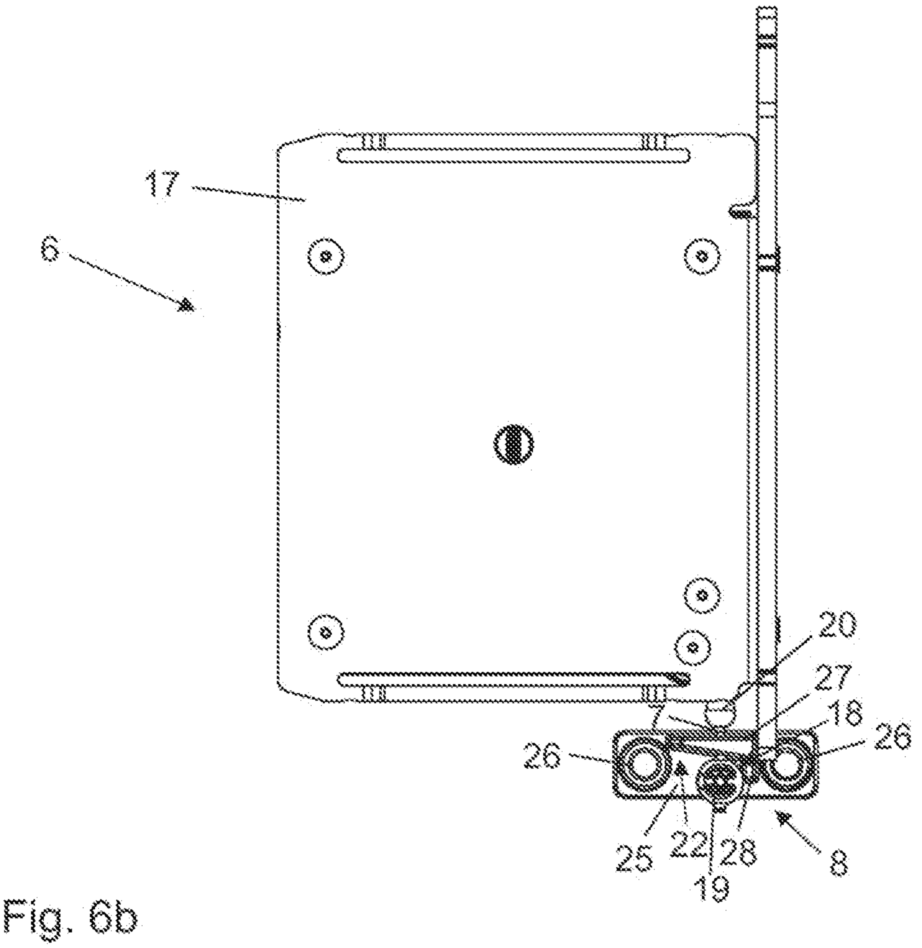
FIGS. 6*a*, 6*b* show the drive device and coupling device according to FIG. 4*a* during a coupling operation, in a view from the side and in a perspective view from below.
Figure 6B:
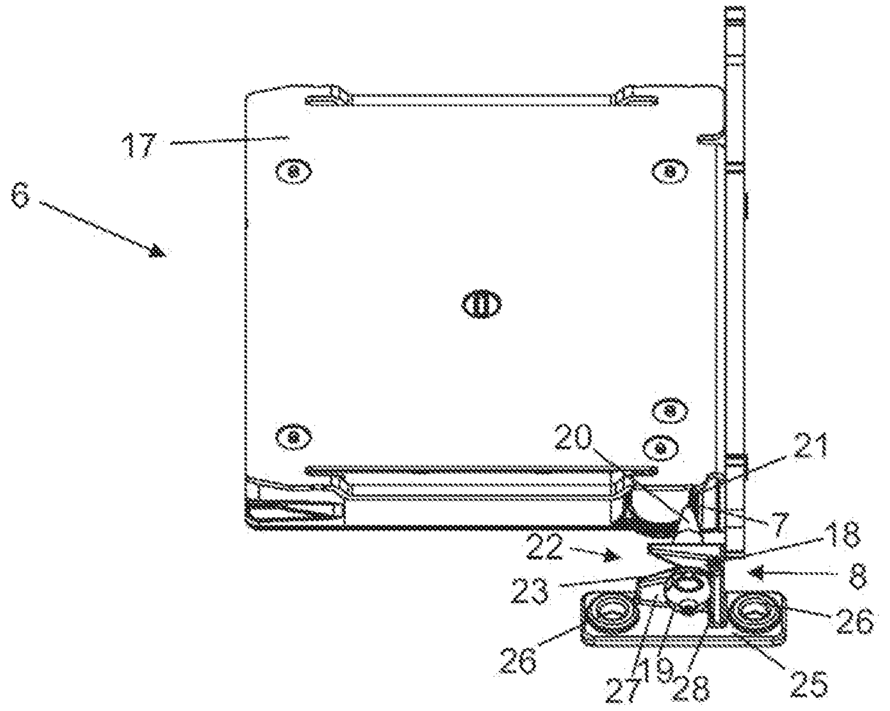

FIG. 6*a* and FIG. 6*b* show the automatic coupling from two different viewing angles, wherein the coupling device 8 is automatically coupled to the cable 7 during an initial relative movement of the carrier 5 (on which the coupling device 8 is arranged) with respect to the guide system 4.

The cable 7 remains connected to the coupling device 8 in the extended position 14, in the retracted position 13 and between the extended position 14 and the retracted position 13, wherein it is also possible for the coupling to be released in the extended position 14 and to be generated anew when the movable furniture part 2 is pushed in again.

The drive device 6 has an exit opening 21 through which the cable 7 of the drive device 6, in a state of use 12 of the assembly 1, projects vertically downward under the force of gravity for the purpose of coupling to the coupling device 8.

The coupling device 8 comprises a base 25 with two openings 26 for fastening means for connecting to the movable furniture part 2 and/or to the carrier 5, wherein the coupling device 8 is particularly preferably fastened to the carrier 5.

A bar 27 which has the receiving device 22 and the holding region 24 for the purpose of secure connection, and a further bar 28 for stiffening purposes, are arranged on the base 25, transversely with respect to the base 25.

Figure 7A:
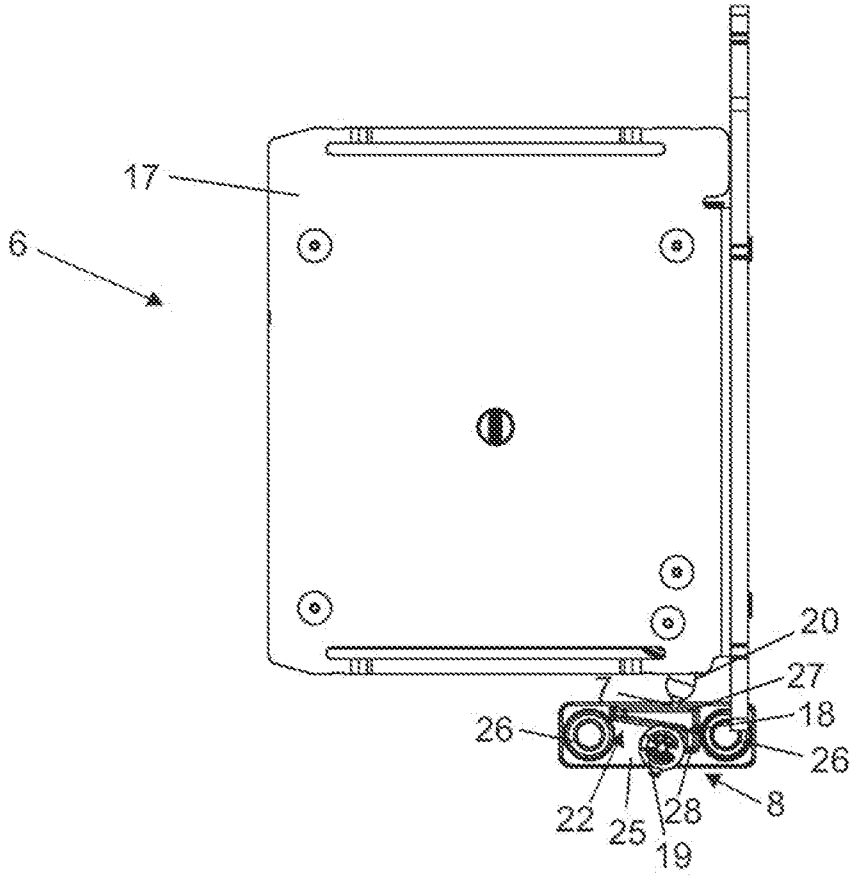
FIGS. 7*a*, 7*b* show the drive device and coupling device according to FIG. 4*a* after a coupling operation, wherein the coupling device has been moved slightly further in relation to FIG. 6*a*, FIGS. 8*a* to 9*b* show the drive device and coupling device according to FIG. 4*a*, wherein the coupling device has been moved relative to the drive device and is moving the cable of the drive device with it.
Figure 7B:
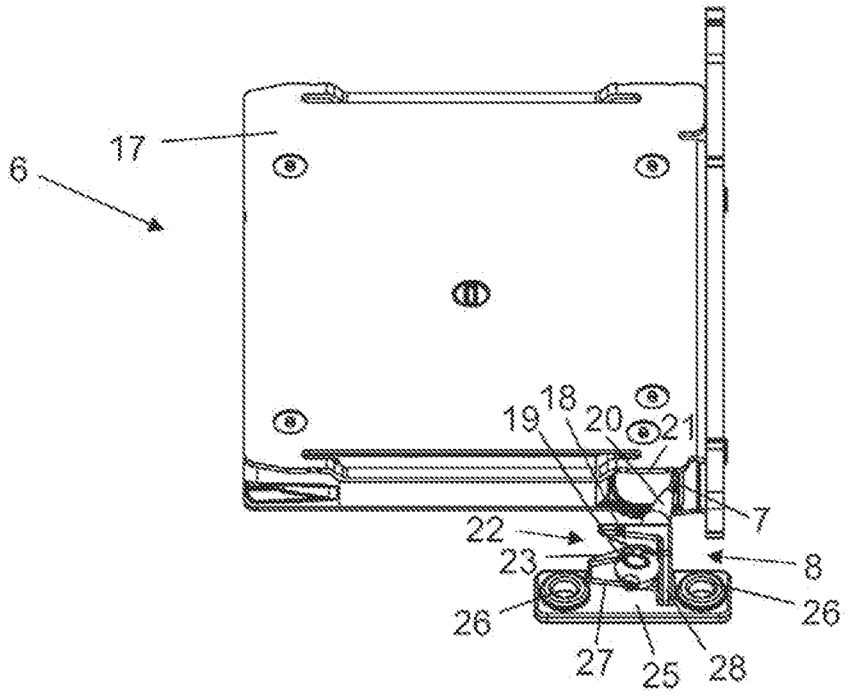

In FIG. 7*a* and FIG. 7*b*, the coupling device 8 has been moved further relative to the drive device 6, wherein the coupling element 18 maintains a connection to the coupling device 8 and moves the cable 7 with it.

Figure 8A:
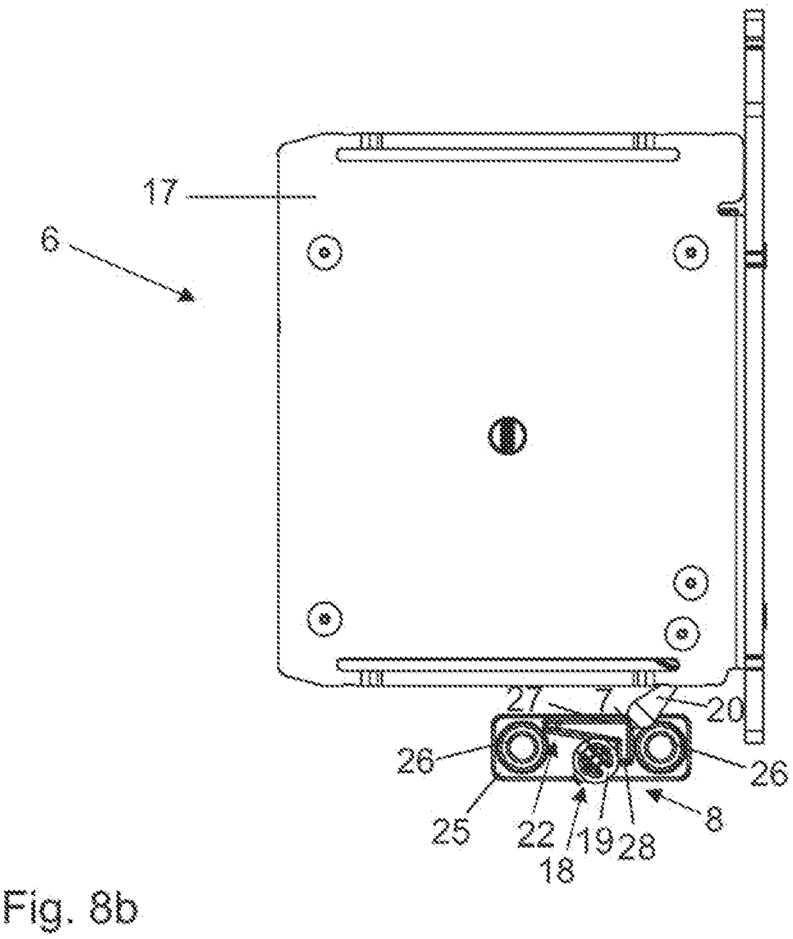
Figure 8B:
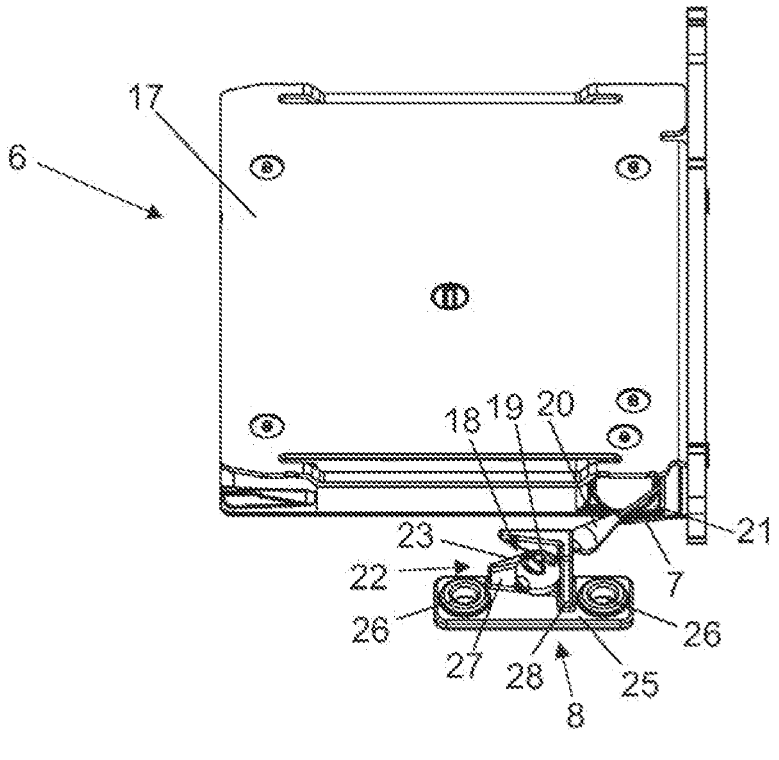

FIG. 8*a* and FIG. 8*b* differ from FIG. 7*a* and FIG. 7*b* merely by the fact that the coupling device 8 has been moved further, wherein the coupling element 18 is pointing in the direction of movement and the spacer 20 is arranged on an opposite side of the receiving device 22.

Figure 9A:
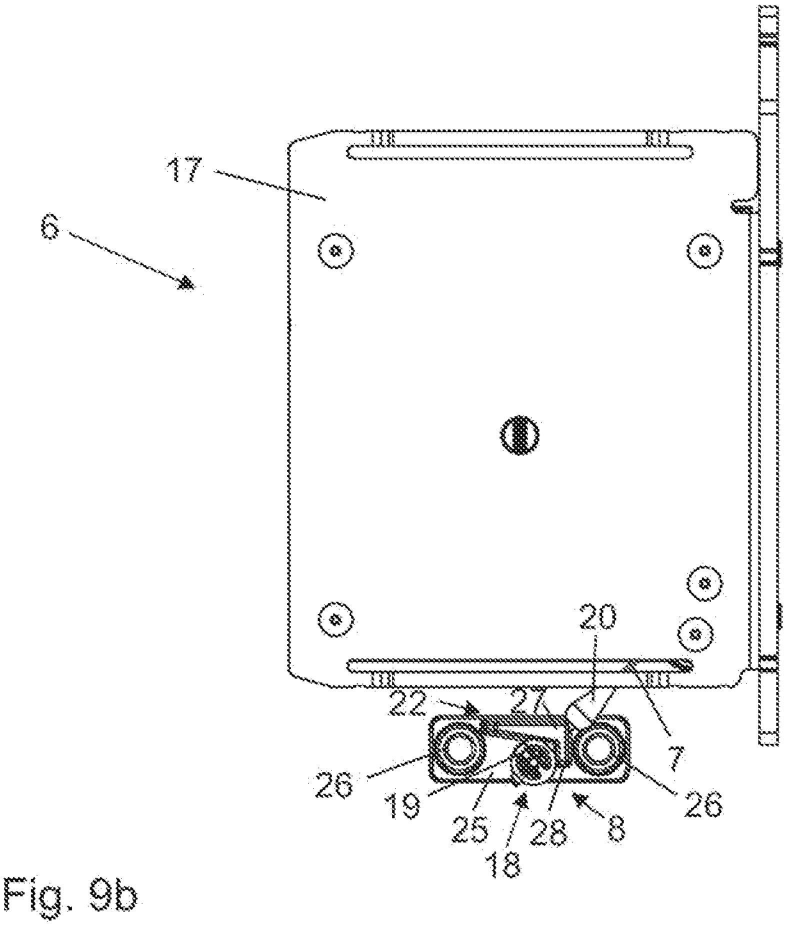
Figure 9B:
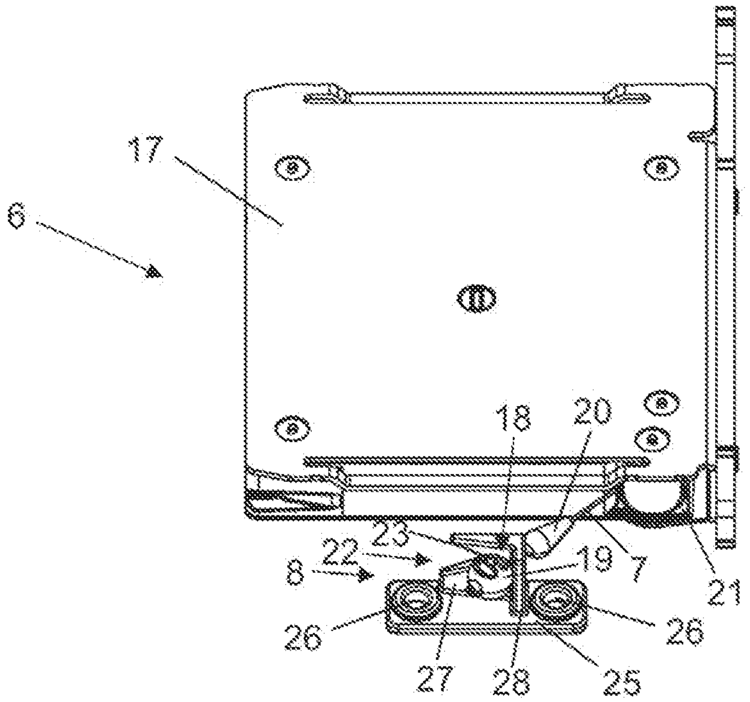

In FIG. 9*a* and FIG. 9*b*, it can be seen how, during a continued movement of the coupling device 8, the cable 7 is moved with the coupling device 8, whereby the energy storage device 16 is charged.

Figure 10:
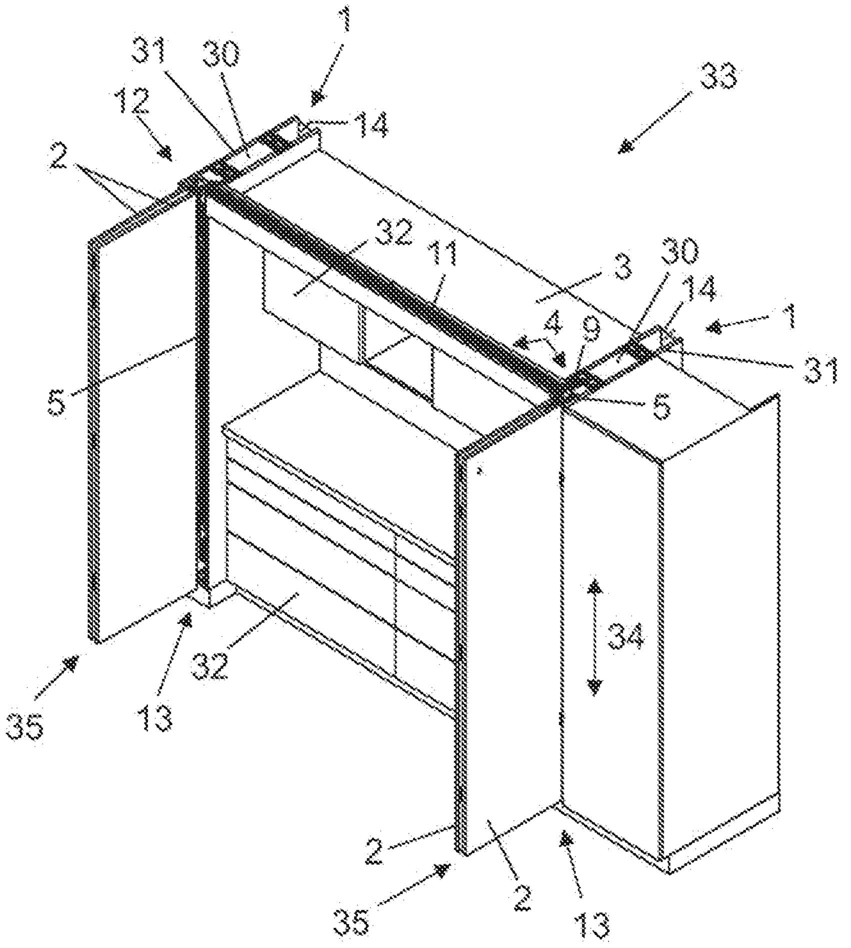
FIG. 10 shows a piece of furniture according to a particularly preferred embodiment, with two receiving slots and two assemblies according to the embodiment according to FIG. 1*a*.

FIG. 10 shows a piece of furniture 33 with two assemblies 1 for moving movable furniture parts 2 that form folding sliding doors. In general, the assembly 1 can also be used for moving single-part sliding doors, for example for the purpose of concealing fitments 32. The furniture parts 2 can be arranged in the two receiving slots 30 by means of the assemblies 1. The two guide systems 4 of the two assemblies 1 are fastened to the furniture carcass 3 via two furniture panels in each case, wherein, on the two furniture panels, there is arranged in each case one further spaced-apart, parallel furniture panel for forming the receiving slots 30.

The drive device 6 is arranged on the guide system 4. The drive device 6 can however also be arranged on the furniture panel of the assembly.

The piece of furniture 33 has a furniture carcass 3 and two furniture parts 2 in the form of a folding sliding door that are mounted so as to be movable relative to the furniture carcass 3, wherein the furniture parts 2, in a state of use 12 of the assembly 1, are connected to one another in an articulated manner by means of a vertically running axle 34. In general, a movable furniture part 2 can also analogously be provided in the form of a sliding door.

The two furniture parts 2 are movable by means of the assembly 1 between a first position 35, in which the furniture parts 2 are oriented substantially parallel to one another, and a second position, in which the furniture parts 2 are oriented so as to be substantially coplanar with respect to one another. The second position is not illustrated; this is generated by virtue of the two furniture parts 2 being opened out, wherein, for improved guidance, a guide carriage that is movable along the second guide rail 11 can be provided for the movement of the two furniture parts 2 relative to the second guide rail 11.

In the second position, fitments 32 are concealed. In the first position 35, the two furniture parts 2 can be pushed into a receiving slot 30 for receiving the furniture parts 2. The two furniture parts 2 are movable by means of the drive device 6 of the assembly 1 from a retracted position 14 in the direction of an extended position 13, wherein an ejection mechanism 29 (not visible, cf. FIG. 1*a*) is provided to support this movement. The ejection mechanism 29 is however generally not required. In the illustration, the furniture parts 2 are shown in the extended position 13, wherein the retracted position 14 is indicated by a cross (X).

The guide system 4 of the assembly 1 comprises a second guide rail 11 for guiding the movable furniture parts 2 orthogonally with respect to the first guide rails 9, wherein the second guide rail 11, in a state of use 12, runs transversely relative to the longitudinal direction 10 of the first guide rails 9 and connects them for a harmonious movement sequence.

The assembly 1 comprises the receiving slot 30 owing to the parallel formation of two furniture panels, wherein the assembly 1 can generally also be provided without a receiving slot 30, and a tapering formation is conceivable. The movable furniture parts 2 can be arranged entirely in the receiving slot 30 in the retracted position 14, wherein a partial arrangement in the receiving slot 30 is also conceivable.

In the extended position 13, the movable furniture parts 2 are movable transversely with respect to a longitudinal extent 31 of the receiving slot 30 by means of the second guide rail 11, in order to conceal the fitments 32.

The invention claimed is:

1. An assembly for guiding at least one movable furniture part relative to a furniture carcass, comprising:

at least one guide system that is fastenable to the furniture carcass;

at least one carrier on which the at least one movable furniture part is mountable, and by means of which the at least one movable furniture part is movable relative to the at least one guide system;

at least one drive device by means of which the at least one carrier is movable relative to the at least one guide system, the at least one drive device having at least one cable; and at least one coupling device arranged on the at least one carrier or configured to be arranged on the at least one movable furniture part, wherein the at least one coupling device is automatically couplable to the at least one cable of the at least one drive device during a relative movement of the at least one carrier with respect to the at least one guide system, whereby the at least one drive device has at least one exit opening through which the at least one cable of the at least one drive device, in a state of use, projects substantially vertically downward under the force of gravity for coupling to the at least one coupling device.

2. The assembly according to claim 1, wherein the at least one guide system comprises at least one first guide rail, with a longitudinal direction, for guiding the at least one carrier along the at least one first guide rail.

3. The assembly according to claim 1, wherein the at least one coupling device is automatically couplable to the at least one cable during an initial relative movement of the at least one carrier with respect to the at least one guide system, or during the initial relative movement of the at least one carrier with respect to the at least one guide system, the at least one cable is connected to the at least one coupling device in an extended position of the at least one carrier, in a retracted position of the at least one carrier, or between the extended position and the retracted position.

4. The assembly according to claim 1, wherein the at least one drive device comprises at least one cable drum for winding up and unwinding the at least one cable, and at least one energy storage device for prestressing the at least one cable drum.

5. The assembly according to claim 4, wherein the at least one energy storage device is configured to be placed under stress during a movement of the at least one carrier in the direction of a retracted position, or is prestressed or unstressed in an extended position of the at least one carrier.

6. The assembly according to claim 1, wherein the at least one cable of the at least one drive device comprises at least one coupling element for connecting the at least one cable to the at least one coupling device, or a spacer element which is spaced apart from the at least one coupling element.

7. The assembly according to claim 1, wherein the at least one coupling device comprises at least one receiving device.

8. The assembly according to claim 7, wherein the at least one coupling device comprises a base for connecting to the at least one movable furniture part or to the at least one carrier.

9. The assembly according to claim 1, wherein the at least one carrier is movable starting from a retracted position, into an extended position by the at least one drive device.

10. The assembly according to claim 1, further comprising at least one ejection mechanism configured to at least partially eject the at least one carrier, starting from a retracted position, in a direction of an extended position.

11. A piece of furniture comprising the assembly according to claim 1.

12. The piece of furniture according to claim 11, wherein the piece of furniture has a furniture carcass and at least two furniture parts that are mounted so as to be movable relative to the furniture carcass, wherein the at least two furniture parts, in a state of use, are connected to one another in an articulated manner by means of a vertically running axle, wherein the at least two furniture parts are movable by means of the assembly between a first position, in which the at least two furniture parts are oriented substantially parallel to one another, and a second position, in which the at least two furniture parts are oriented so as to be substantially coplanar with respect to one another.

13. A method of installing and coupling the assembly according to claim 1, the method comprising:

preparing the assembly by arranging the at least one carrier on the at least one guide system;

moving the at least one carrier relative to the at least one guide system such that the at least one cable of the at least one drive device is subsequently automatically coupled to the at least one coupling device.

14. The method according to claim 13, wherein at least one energy storage device of the at least one drive device is placed under stress during a movement of the at least one carrier from an extended position in a direction of a retracted position, or a movement of the at least one carrier from a retracted position in a direction of an extended position is supported.

15. The assembly according to claim 1, wherein the at least one movable furniture part comprises a sliding door or a folding sliding door, and the at least one carrier is configured to have the sliding door or folding sliding door mounted thereon in a pivotable or articulated manner.

16. The assembly according to claim 2, wherein the at least one carrier is movable along the at least one first guide rail between an extended position and a retracted position, or the at least one guide system further comprises at least one second guide rail, wherein the at least one second guide rail, in a state of use, runs transversely relative to the longitudinal direction of the at least one first guide rail.

17. The assembly according to claim 4, wherein the at least one cable drum or the at least one energy storage device is arranged within a housing of the at least one drive device.

18. The assembly according to claim 17, wherein the at least one cable drum or the at least one energy storage device is arranged entirely within the housing of the at least one drive device.

19. The assembly according to claim 6, wherein:

the at least one cable of the at least one drive device comprises the at least one coupling element, and the at least one coupling element comprises a ball; or the at least one cable of the at least one drive device comprises the spacer element, and the spacer element is configured to space the at least one coupling element from a housing of the at least one drive device.

20. The assembly according to claim 7, wherein the at least one receiving device comprises a tapering depression or a holding region.

21. The assembly according to claim 8, wherein the base has at least one opening for fastening means for connecting to the at least one movable furniture part or to the at least one carrier, and wherein at least one bar which has the at least one receiving device arranged thereon is arranged on the base transversely with respect to the base, or a stiffening bar is arranged on the base transversely with respect to the base.

22. The assembly according to claim 9, wherein the at least one carrier is automatically movable starting from the retracted position into the extended position by the at least one drive device.

23. The assembly according to claim 10, wherein the at least one carrier, in the retracted position, is movable by exertion of pressure on the at least one carrier into an overpressed position situated behind the retracted position so as to trigger the at least one ejection mechanism.

24. The piece of furniture according to claim 11, wherein the piece of furniture has a furniture carcass and at least one movable furniture part that is mounted so as to be movable relative to the furniture carcass, wherein the assembly comprises at least one receiving slot in which the at least one movable furniture part is arrangeable in a retracted position.

25. The piece of furniture according to claim 12, wherein the furniture carcass has at least one receiving slot for receiving the at least two furniture parts in the first position, or the at least two furniture parts are movable by means of the at least one drive device from a retracted position in a direction of an extended position.

26. The method according to claim 14, wherein the movement of the at least one carrier from the retracted position in the direction of the extended position is supported via at least one ejection mechanism.

* * * * *